Patented Aug. 30, 1932

1,874,055

UNITED STATES PATENT OFFICE

ARTHUR LIEBRECHT, OF FRANKFORT-ON-THE-MAIN, GERMANY, ASSIGNOR TO THE FIRM CHEMISCH-PHARMAZEUTISCHE AKTIENGESELLSCHAFT BAD HOMBURG, A CORPORATION OF BAD HAMBURG, V. D. H.

PROCESS FOR PREPARING SUITABLE SUBSTITUTES FOR TABLE SALT FOR FLAVORING PURPOSES

No Drawing. Application filed May 17, 1929, Serial No. 364,001, and in Germany May 19, 1928.

A series of substances exists which, like sodium chloride, has a saline taste, but, owing to a certain subsidiary taste, is not suitable for flavoring purposes as substitutes for common salt (NaCl). This class of substances includes, for example, the soluble salts of acids, such as formic acid, lactic acid or acetic acid as well as certain halogen compounds, such as potassium chloride and other halogen salts, etc.

It has been found that substances of this kind may be converted into products having a pleasant salt-like taste by means of weak acids, such as amino acids or their acid salts. Glutamic acid and its acid salts or mixtures containing the same, particularly mixtures with other amino acids or acid salts of amino acids, such as those which may be obtained from albumen of animal or vegetable origin, albuminous products, decomposition products of albumen and the like by treatment with mineral acids, are particularly suitable for carrying the process into effect.

The preparation of the salt substitute may, for example, be effected by causing the components, if necessary in the presence of solvents, for example water, to react on one another, after which the solvent may be again removed, for example by gentle evaporation.

The removal of the alkaline taste of, for example, formic acid and lactic acid salts by means of amino acids or their acid salts is, however, due to the fact that the $P_H$ value of the resultant product has been shifted to the acid side by the interaction of the components. The solubility of glutamic and the like acids and their salts in water is, at the same time, considerably increased thereby. Insoluble salts of glutamic acid and the like, such as calcium glutamate etc., like the free acid, show a considerable increase in their solubility in water.

Examples 1. 3 parts of sodium formate and 1 part of acid sodium glutamate are stirred into a paste with a small quantity of water and the latter evaporated to dryness in a vacuum. A white, sometimes slightly colored, light soluble powder having a pure saline taste is obtained, which no longer possesses the alkaline taste of sodium formate.

2. 10 gms. of glutamic acid are introduced into 300 cc. of a 30% sodium formate solution ($P_H = -8.0$). After shaking for a short time a completely clear solution results.

Glutamic acid content in 100 cc. = 3.33 gms., $P_H = -4.5$.

3. 10 gms. of glutamic acid are introduced into 250 cc. of a 35% solution of sodium lactate ($P_H = -8.1$) and shaken for a few minutes at room temperature. The glutamic acid goes completely into solution. The solution has a glutamic acid content of 4% and a $P_H$ value of $-4.9$.

4. 10 gms. of glutamic acid are treated with 140 cc. of a 22% sodium acetate solution ($P_H = -8.3$). After repeated shaking a completely clear solution results, of which 100 cc. contain 7.15 gms. of glutamic acid and $P_H = -5.5$ (whereas 100 cc. of water at 17° C. only dissolve 0.90 gms. of glumatic acid).

Glutamic acid and acid glutamates have a similar favorable effect on the taste of halogen salts, such as potassium chloride, as they have, for example, on formic acid salts and the like.

In place of acid sodium glutamate, mixtures of different amino acids or acid salts of amino acids may with advantage be employed, such as those which may be obtained by heating albumen of animal or vegetable origin, albuminous products, decomposition products of albumen and the like with mineral acids, and, if desired, converting the organic acids formed into salts, preferably after first removing the mineral acid.

In certain cases, in place of employing amino acids or acid salts of amino acids on the one hand and, for example, formates or lactates on the other hand, mixtures, which are capable of yielding the required substances may also be employed. Thus, for example, a formate or lactate or, if desired, the free acids, may be introduced in suitable proportions into the process for preparing the amino acid or the amino acid salts or mixtures of the same.

The salt preparations according to this invention may be obtained, as shown in example I, in the form of a powder capable of being sprinkled. It is, however, also possible to prepare a solution and to market this as such, thus avoiding, for example, the removal of water by means of vacuum distillation.

The products prepared according to this invention may be employed for flavoring purposes in place of ordinary table salt, for example as an addition to foods and drinks. The salt preparations, which are absolutely harmless, have inter alia a stimulating effect on the appetite.

Admixtures, for example, taste-improving substances, may, if desired, also be incorporated with the preparations. The incorporation may, if desired, be effected during the process of preparation. The taste-improving substances may be both of animal origin as well as of vegetable origin.

What I claim is:

1. A process for preparing substitutes for common salt for flavoring purposes, and which substitutes are free from chlorine, which process comprises mixing together a palatable salt of formic acid and palatable acid compounds containing amino acid residues, said substances being mixed together in the presence of moisture in quantities such that the alkaline taste of the formic acid salt disappears.

2. A process for preparing substitutes for common salt, suitable for flavoring purposes, which comprises mixing together water, a soluble salt of formic acid, and acid compounds which contain amino acid residues, said substances being mixed together in quantities such that the alkaline taste of the formic acid salt disappears.

3. A process for preparing substitutes for common salt for flavoring purposes, and which substitutes are free from chlorine, said process comprising mixing palatable salts of organic acids, which taste like common salt but have an alkaline subsidiary taste, with acid compounds containing amino acid residues, said substances being mixed together in the presence of moisture in quantities such that the alkaline taste of the organic acid salts disappears.

4. A process for preparing substitutes for common salt, suitable for flavoring purposes, which comprises mixing together water, an alkali metal formate and glutamic acid, and agitating said mixture thereby causing reaction between the ingredients resulting in a clear solution.

5. A process for preparing substitutes for common salt, suitable for flavoring purposes, which comprises mixing together water, sodium formate and acid sodium glutamate, and agitating said mixture thereby causing reaction between the ingredients resulting in a clear solution which, upon evaporation to dryness, will result in a light soluble powder of non-alkaline taste.

6. As a new product, a substitute for table salt, comprising the reaction product of an alkali metal formate and glutamic acid.

7. As a new product, a substitute for table salt, comprising the reaction product of an alkali metal formate and an acid alkali glutamate.

In testimony whereof I affix my signature.

ARTHUR LIEBRECHT.